United States Patent [19]

Elser et al.

[11] Patent Number: 5,492,944
[45] Date of Patent: Feb. 20, 1996

[54] PURE-ALIPHATIC COMPOUND-SOLUBLE POWDERY BONDING AGENT FOR PAINTS

[75] Inventors: Wilhelm Elser, Griesheim; Karl J. Fölsch, Mainz; Peter Rossberg, Seeheim-Jugenheim; Dieter Tessmer, Rüsselsheim; Michael Wicke, Seeheim-Jugenheim, all of Germany

[73] Assignee: Roehm GmbH Chemische Fabrik, Darmstadt, Germany

[21] Appl. No.: 348,955

[22] Filed: Nov. 25, 1994

Related U.S. Application Data

[63] Continuation of Ser. No. 164,573, Dec. 10, 1993, abandoned.

[30] Foreign Application Priority Data

Dec. 10, 1992 [DE] Germany .............................. 9216813 U

[51] Int. Cl.$^6$ ........................................................ C08L 83/00
[52] U.S. Cl. .......................... 523/201; 524/553; 525/297; 525/902; 526/309; 526/328
[58] Field of Search .......................... 523/201; 524/553; 525/297, 902; 526/309, 328

[56] References Cited

U.S. PATENT DOCUMENTS

| | | | |
|---|---|---|---|
| 3,751,449 | 8/1973 | Gobran | 526/309 |
| 4,387,204 | 6/1983 | Zahir | 526/309 |
| 4,594,448 | 6/1986 | Hohage | 526/309 |

FOREIGN PATENT DOCUMENTS

| | | |
|---|---|---|
| 0138033 | 4/1985 | European Pat. Off. . |
| 0287842 | 10/1988 | European Pat. Off. . |
| 0370339 | 5/1990 | European Pat. Off. . |
| 0452200 | 10/1991 | European Pat. Off. . |
| 2117189 | 7/1972 | France . |

OTHER PUBLICATIONS

"Lehrbuch Der Organischen Chemie", Prof. Dr. Hans Beyer, 1958.

Primary Examiner—Edward Cain
Attorney, Agent, or Firm—Oblon, Spivak, McClelland, Maier & Neustadt

[57] ABSTRACT

A powdery bonding agent for paints which is soluble in pure aliphatic compounds, and which is in the form of powdery polymerizate particles, which consists of, at least on the particle surface, of a copolymerizate formed of: (i) 60 to 95 percent by weight of units of at least one hardening monomer selected from the group consisting of (A) isobutylmethacrylate and (B) cycloalkylmethacrylate; and (ii) 5 to 40 percent by weight of units of at least one aliphatic-substance-solubilizing monomer selected from the group consisting of (C) alkylmethacrylates having 6 to 18 carbon atoms in the alkyl residue, where the units of isobutylmethacrylate account for no more than 60 percent by weight and the units of cycloalkylmethacrylates account for no less than 10 percent by weight, based on, in each case, the weight of the copolymerizate.

11 Claims, No Drawings

PURE-ALIPHATIC COMPOUND-SOLUBLE POWDERY BONDING AGENT FOR PAINTS

This application is a continuation of application Ser. No. 08/164,573, filed on Dec. 10, 1993, now abandoned.

BACKGROUND OF THE INVENTION

1. Field of the Invention

The present invention relates to a powdery bonding agent that is soluble in pure aliphatic compounds, that is used for paints, and which contains powdery polymerizate particles based on methacrylic acid esters, as well as to a solution of the polymerizate in aromatic-substance-free petroleum and to a paint prepared from it.

2. Description of the Background

German patent No. 2,060,545 discloses a bonding agent for air-drying paints which is based on a copolymerizate of isobutylmethacrylate, acrylesters of higher alcohols, and small portions of polymer comonomers, as well as hydroxyalkylesters of acrylic and/or methacrylic acid. This bonding agent is soluble in petroleum poor in aromatic components but insoluble in pure-aliphatic petroleum. Because of the necessity of the presence of at least a portion of highly odorous and toxic aromatic substances in the solvent, paints formulated on such a base are suitable for outdoor paints but not for indoor paints. For fast-drying indoor paints, one needs bonding agents that are soluble in odorless, nontoxic pure aliphatic substances.

Solubility in pure aliphatic compounds can be achieved by increasing the share of long-chain alkylesters of acrylic acid and/or methacrylic acid in the structure of the bonding agent; but these bonding agents entail disadvantages that have established limits on their practical use. In the form of granular substances, beads, or powders, they are somewhat sticky, which limits the time that they can be stored. They are inclined toward caking in the case of summertime storage temperatures, which makes it more difficult to handle the solid bonding agent and which delays its dissolution. Of course, one can improve the block-up resistance of the polymerizate, if one increases the amount of isobutylmethacrylate at the expense of long-chain alkylmethacrylate. But then solubility in pure aliphatic solvents is lost. A need therefore continues to exist for a bonding agent which is soluble in pure aliphatic solvents and at the same time does not clot and does not exhibit block-up resistance.

SUMMARY OF THE INVENTION

Accordingly, one object of the invention is to increase the block-up resistance of a bonding agent that is soluble in pure-aliphatic petroleum solvents and is therefore useful in paint formulations, which is based on methacrylic esters, and which will remain storable as a fine, quickly-soluble powder even at summertime temperatures, that is, in the range of 25° to 40° C., without block-up or clotting.

Briefly, this object and other objects of the present invention as hereinafter will become more readily apparent can be attained by a powdery bonding agent which is soluble in pure aliphatic solvents, which exists as powdery polymerizate particles, and which consists of, at least on the particle surfaces, of a copolymerizate formed from the following monomers: (i) 60 to 95 percent by weight of units of at least one hardening monomer selected from the group consisting of (A) isobutylmethacrylate and (B) cycloalkylmethacrylates; and (ii) 5 to 40 percent by weight of units of at least one monomer (C), which makes the polymerizate soluble in aliphatic petroleum, selected from the group consisting of $C_6$–$C_{18}$ alkyl methacrylates, wherein the units of isobutylmethacrylate account for no more than 60 percent by weight of the weight of the copolymerizate and the units of cycloalkylmethacrylate account for no less than 10 percent by weight, of the weight of the copolymerizate. Monomers A, B and C, together as a rule, make up at least 90 percent by weight of the copolymerizate.

DETAILED DESCRIPTION OF THE PREFERRED EMBODIMENTS

The problem addressed by the present invention cannot be solved with copolymerizates made up of monomers A and C alone. When the share of isobutylmethacrylate is high enough to ensure block-up resistance, then the copolymerizate is no longer soluble in aliphatic compounds. If the proportion of longer-chain alkylmethacrylates is greater, one can of course attain solubility in aliphatic compounds, but not block-up resistance. Further, on the one hand, cycloalkylmethacrylates have the special property of resulting in hard polymerizates and copolymerizates whereas, on the other hand, they promote solubility in pure-aliphatic petroleum-hydrocarbons, although their homopolymerizates are not sufficiently soluble in aromatic-substance-free petroleum. The property combination of adequate block-up resistance and petroleum solubility is attained only by the amounts of higher alkylmethacrylates in the copolymerizate. The solubility of acrylopolymerizates consisting of alkylmethacrylates with more than 3 carbon atoms in the alkyl residue and cycloalkylmethacrylates in aromatic-substance-poor petroleum is known from E-A 370, 339. However, the relative hardness and absence of block-up in such copolymerizates, when formulated as in the present invention, is not taught by the patent.

In the present invention, the objectives of easy solubility in aromatic-substance-free, pure-aliphatic petroleum hydrocarbons and block-up absence of fine powders of the polymerizate at temperatures between 25° and 40° C. can be attained by coordinating the hardening and the aliphatic-substance-solubilizing monomer components when structuring the copolymerizate.

Isobutylmethacrylate has a hardening effect, but it reduces the solubility of the polymerizate in aliphatic compounds. One can entirely dispense with isobutylmethacrylate in order to ensure good solubility in aliphatic compounds and hardness; but then large amounts of the comparatively expensive cycloalkylmethacrylates are required. The share of the comparatively reasonably-priced isobutylmethacrylate, however, is selected to be as large as possible for reasons of economy. As a rule, it is at least 5 percent by weight and preferably 20 to 50 percent by weight.

Cyclohexylmethacrylate and 3,3,5-trimethylcyclohexylmethacrylate are particularly preferred among the cycloalkylmethacrylates. The share of this component in the copolymerizate is at least 10 percent by weight and preferably 10 to 40 percent by weight, especially 20 to 30 percent by weight.

Along with the block-up and solubility properties of the bonding agents according to the invention, their effectiveness in terms of dispersion plays an important role for pigments and fillers. It is promoted by 0.1 to 10 percent by weight of units of functional comonomers with polar groups. Because such functional comonomers impair aliphatic compound solubility, they are used in the smallest possible quantity, preferably 0.1 to 2 percent by weight. Preference is given here to comonomers with one hydroxyl group, such as hydroxyethyl or hydroxypropyl-acrylate and -methacrylate. Other suitable functional groups are carboxyl groups that can come from units of acrylic acid or methacrylic acid, maleic, fumaric, or itaconic acid, tertiary amino groups that can be built in by way of correspondingly substituted alkylesters of acrylic and/or methacrylic acid, or in a smaller measure, as carbonamido groups, for example, acrylamide or methacrylamide.

The copolymerizates, according to the invention, can be made from the monomers A, B, and C in the claimed quantity relationships according to customary processes of radical polymerization, such as emulsion, bead, or bulk polymerization.

Single-stage or multi-stage emulsion polymerization in the aqueous phase is preferred here in the presence of a regulating agent, as well as customary emulsifiers and radical initiators. An aqueous dispersion is obtained from which the polymerizate powder is obtained preferably by means of spray drying. Here low drying temperatures are preferred, especially in the area of the air outlet, such that the latex particles do not completely melt together. Suitable output temperatures are, for example, in the range between 50° and 70° C. The less the latex particles inside the little powder grains are melted together, the more quickly will the powder dissolve in the thinner.

Suspension polymerization in the aqueous phase is another suitable manufacturing process. Here, the monomer mixture of A, B, C, with an adequate content of dissolved, radical-forming initiators in the presence of suitable distribution agents, such as in the presence of aluminum hydroxide, precipitated in the presence of tensides, is distributed in droplets with an average size of between 0.005 to 1 mm, which harden to form polymerizate beads when heated to, for example, 80° C. Emphasis is on a large, essentially complete transformation of the monomers that are used. The finer the beads, the more quickly they can be dissolved. The bead size is influenced in the known manner by the type and quantity of the suspension agent and the stirring speed. The polymerizate can be separated from the aqueous phase by filtration or centrifugation and adhering remnants of the suspension agent can be removed from them by washing with water. The moist polymerizate beads are dried at temperatures of between 40° and 70° C., for example, in a drying chamber or a suspension dryer.

In the course of polymerization without solvents or suspension agents, the solid polymerizate is obtained, for example, in the form of blocks or slabs that are ground into a powder with a suitable mill. One can also, first of all, press the polymerizate in the thermoplastic state by means of an extruder to form thin strands and then the strands can be crushed to a granular material. Prior to pulverizing, it is a good idea to cool the polymerizate to a low temperature at which it is brittle; this will facilitate the formation of fine powder particles. Small powder grains in the range between 0.005 and 3 mm are desired.

The solution viscosity of the copolymerizate according to the invention must lie within a spread that is suitable for bonding agents to be used in paints. By also using regulating agents during polymerization, the molecular weight of the copolymerizate can be regulated such that the reduced viscosity, measured in chloroform, is within the range of 10 to 70 ml/g, preferably 20 to 40 ml/g. That applies for each of the above-described polymerization procedures.

Bonding agents in the viscosity range stated are not cross-linked. In order to prepare a paint, frequently thickening additives are employed to attain favorable processing properties, which include a swiftly terminating flow pattern, or to increase the stability and avoid pigment deposits. In pure-aliphatic paints, these additives, as well as the bonding agent itself, must be soluble or swellable, in aromatic-substance-free petroleum hydrocarbons and must be compatible with them. The bonding agents according to the invention, are suitable for this purpose if they are slightly cross-linked or branched. In addition to monomers of groups A, B, and C, a multiple ethylenically unsaturated, radically polymerizable monomer is used to build-up such polymer, the amount of which, however, must be restricted so that the polymerizate will still be colloidally soluble. Here it is suitable, for example, to add 0.1 to 2 percent by weight—in terms of the total weight of the monomer—of allylmethacrylate, glycoldimethacrylate or 1,4-butanedioldimethacrylate.

The polymerizate properties on the surface of the powder particles are critical as far as the block-up properties are concerned. To prevent block-up and clotting, it suffices to have the powder particles consist, only along the surface, of one layer of the copolymerizate according to the invention, whereas the interior can consist of a pure-aliphatic-soluble polymerizate that is suitable as a bonding agent for paints, and which interior must be compatible in the solution to be made in petroleum hydrocarbons with the polymerizate of the shell, but that can have higher adhesiveness for block-up inclination. In this way, the amount of comparatively expensive cycloalkylmethacrylates <> related to the entire bonding agent can be definitely reduced, <which is required to attain block-up resistance,> without having to forego the advantageous effect of such cycloalkylmethacrylates.

The surface layer, consisting of the non-sticky polymerizate, need not consist of a compact shell. Instead, it is sufficient for the surface layer to be deposited in the form of islands on the surface of the particles and to act as a spacer between the individual granules. Powdery polymerizate particles with such a core-shell structure can be made in various ways, for example, by multistage emulsion polymerization, where, in a first polymerization phase, a possibly more strongly adhesive core polymerizate is prepared, and where, in a second phase, the shell polymerizate is made from monomers A, B and C without the formation of new particles.

The block-up resistance of a pearl polymerizate can be increased correspondingly by applying, after completed bead polymerization, upon the polymerizate beads, an adhesive deposit consisting of an acryloresin dispersion made up according to the invention. A suitable process for deposit formation is known from *(EP-82 455). The method consists in adding a small quantity of the acryloresin dispersion to the aqueous phase of bead polymerization and then precipitating the acryloresin on the beads, for example, with salts or acids. For example, a small quantity of 0.5 to 5 percent by weight of a particularly hard, pure-aliphatic-soluble bonding agent powder, according to the invention, will suffice. The following, for example, are suitable: emulsion polymerizates consisting of 90–95 percent by weight of cycloalkylmethacrylates and 5–10 percent by weight of long-chain alkylmethacrylates. In that way, a comparatively low block-up resistance on the part of the bonding agent powder can be extensively balanced out.

* U.S. Pat. No. 4,463,032, incorporated therein by reference

Use of Copolymerizate as Bonding Agent

Until it is used, the powdery bonding agent can be stored and transported in sacks, drums, silos, and similar powder containers, without the bonding agent losing its powdery nature, even at summertime temperatures.

To make paints, the polymerizate powder is dissolved in the desired thinner, preferably in aromatic-substance-free petroleum, with a boiling range of 60° to 200° C. Suitable bonding agent concentrations are between 5 and 30 percent by weight, depending on how the polymerizate powder is to be used. The desired pigments, fillers, and adjuvants are stirred into and dispersed in the bonding agent solution. By this procedure air-drying paints are obtained that dry practically without odor when pure aliphatic compounds are used as solvents.

The above-mentioned, slightly cross-linked polymerizates can also be used according to the invention to modify the viscosity and the processing properties by way of additional bonding agents with a thickening effect. As a rule, it suffices to add 5 to 20 percent by weight of additional bonding agent, based on the total bonding agent content.

Having generally described this invention, a further understanding can be obtained by reference to certain specific examples which are provided herein for purposes of illustration only and are not intended to be limiting unless otherwise specified.

EXAMPLES

Preparation of Bonding Agents

A solution of 0.347 g $C_{15}$-paraffinsulfonate-Na-salt as emulsifier, and 0.495 g ammoniumperoxidisulfate as radical initiator prepared in 396 grams of deionized water at 20° C. is heated to 80° C. in a reaction vessel with a capacity of 2 l, equipped with heating and cooling devices, reflux condenser, stirring mechanism and feeder vessel. A monomer emulsion, consisting of the constituents listed below, is uniformly added while stirring, over a period of 4 hours:

| | |
|---|---|
| 461.7 g | isobutylmethacrylate |
| 182.3 g | 3,3,5-trimethylcyclohexylmethacrylate |
| 162.0 g | 2-ethylhexylmethacrylate |
| 4.05 g | 2-hydroxypropylmethacrylate |
| 2.84 g | dodecylmercaptan as regulator |
| 7.43 g | $C_{15}$-paraffinsulfonate-Na-Salt |
| 608.7 g | deionized water |

Subsequently, the preparation is stirred for one hour at 80° C. and is cooled to room temperature. At 70° C., 1.01 g 1,4-diisopropylbenzol-monohydroperoxide and 0.406 g Na-hydroxymethylsulfinate are added for the purpose of polymerizing the remaining monomers. The dispersion is filtered at 35° C. It has a solids content of 45 percent by weight.

In a laboratory atomization dryer (Niro Atomizer, Type Minor Production), equipped with a suction fan, an air heater, a dosing device, and an atomizer washer plate, the dispersion is dried to form a powder (A). It is introduced into the spray drying tower by means of a dosing device with a processing rate of 6.4 kg/hr via a liquid distributor upon the atomizer plate washer that rotates at 20,000 rpm. The air temperature at the entry is 134°–138° C., and at the outlet it is 60°–62° C. There, the powder is separated from the air current and trapped in a powder container.

Four other bonding agent powders, B–E, prepared under the conditions of the table infra, are produced in the same fashion:

| Composition | A | B | C | D | E |
|---|---|---|---|---|---|
| Isobutylmethacrylate | 57 | 57 | 44.5 | 35 | — |
| 3,3,5-trimethyl-cyclohexylmethacrylate | 22.5 | 32.5 | 35 | 54.5 | 95 |
| 2-ethylhexyl-methacrylate | 20 | 10 | 20 | 10 | 5 |
| 2-hydroxypropyl-methacrylate | 0.5 | 0.5 | 0.5 | 0.5 | — |
| pH-value | 2.8 | 2.8 | 2.8 | 2.8 | 3.5 |
| Latex particle diameter, nm | 250 | 255 | 212 | 232 | 154 |
| red. viscosity, $CHCl_3$, at 20° C., ml/g | 31 | 30 | 28 | 26 | — |

Bonding agent A is clearly soluble up to −5° C., while bonding agents B to E are clearly soluble up to −10° C. in pure-aliphatic solvents (industrial Isododekan). To test the block-up resistance, a bonding agent powder pile is loaded in a cylinder for 16 hours at 40° C. with 160 g/cm$^2$, and the pourability of the agent is tested after the load has been removed. Only bonding agent A showed a slight degree of caking that is again easily dissolved and does not impair its usefulness. All other bonding agents keep free flowing.

Production of Paints 45-percent bonding agent solutions are made in the dissolver from 90 grams of bonding agents A to E and 110 g of industrial Isododekan (solvent ID). The following are placed in a stirring vessel to make 1 kg of odorless wall paint for indoor use:

| | |
|---|---|
| 200 g | the bonding agent solution |
| 87 g | industrial Isododekan |
| 3 g | Sojalecithin as wetting agent |
| 33 g | Pyromellitic acid ester as softening agent |

The following constituents are added while stirring:

| | |
|---|---|
| 63 g | silica gel |
| 168 g | rutile-titaniumdioxide |
| 346 g | calcium carbonate filler mixture |
| 11 g | thickneing agent on acrylate base (spray-dried emulsion polymerizate consisting of cycloalkyl methacrylate, iso-octyl-methacrylate and allylmethacrylate). |
| 89 g | industrial Isododekan |

The paint can be applied with brushes or rollers on plaster backed, rough-fiber wall paper and textile wallpaper at room temperature; they dry quickly and almost odorlessly to form hard, mechanically resistant coats of paint. The paints can be adjusted in the known manner to the desired degree of gloss by the type and quantity of pigments and fillers used.

Because the pure-aliphatic solvents used do not etch many synthetic substances, such as, for example, polystyrene, and because, moreover, they are distinguished by good weather resistance, one can also advantageously use the paints made up along the lines of the invention for outdoor painting, particularly for coating polystyrene foam materials; this is important in the field of heat insulation.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A powdery bonding agent for paints which is soluble in pure aliphatic compounds, and which is in the form of powdery polymerizate particles, which consists of, at least on the particle surface, of a copolymerizate formed of:
- (i) 60 to 95% by weight of units of the hardening monomers in amounts of
  - (A) 5 to 60% by weight of isobutylmethacrylate and
  - (B) at least 10% by weight of cycloalkylmethacrylate or a substituted cycloalkylmethacrylate; and
- (ii) 5 to 40% by weight of units of at least one monomer which enhances solubility in aliphatic substance selected from the group consisting of
  - (C) alkylmethacrylates having 6 to 18 carbon atoms in the alkyl residue.

2. A powdery bonding agent for paints which is soluble in pure aliphatic compounds, and which is in the form of powdery polymerizate particles, which consists of, at least on the particle surface, of a copolymerizate formed of:
- (i) 60 to 95% by weight of units of the hardening monomers in amounts of
  - (A) 5 to 60% by weight of isobutylmethacrylate and
  - (B) at least 10% by weight of cycloalkylmethacrylate or a substituted cycloalkylmethacrylate;
- (ii) 5 to 40% by weight of units of at least one monomer which enhances solubility in aliphatic substances selected from the group consisting of
  - (C) alkylmethacrylates having 6 to 18 carbon atoms in the alkyl residue, with monomers A, B and C together constituting at least 90% of the copolymerizate; and
  - (D) from 0.1 to 10% of monomers containing a polar group.

3. A powdery bonding agent for paints which is soluble in pure aliphatic compounds, and which is in the form of powdery polymerizate particles, which consists of, at least on the particle surface, of a copolymerizate formed of:
- (i) 60 to 95% by weight of units of the hardening monomers in amounts of
  - (A) 5 to 60% by weight of isobutylmethacrylate and
  - (B) at least 10% by weight of cycloalkylmethacrylate or a substituted cycloalkylmethacrylate;
- (ii) 5 to 40% by weight of units of at least one monomer which enhances solubility in aliphatic substances selected from the group consisting of
  - (C) alkylmethacrylates having 6 to 18 carbon atoms in the alkyl residue, with monomers A, B and C together constituting at least 90% of the copolymerizate; and
  - (E) from 0.1 to 2% of multiple ethylenically unsaturated monomers.

4. A powdery bonding agent for paints which is soluble in pure aliphatic compounds, and which is in the form of powdery polymerizate particles, which consists of, at least on the particle surface, of a copolymerizate formed of:
- (i) 60 to 95% by weight of units of the hardening monomers in amounts of
  - (A) 5 to 60% by weight of isobutylmethacrylate and
  - (B) at least 10% by weight of cycloalkylmethacrylate or a substituted cycloalkylmethacrylate;
- (ii) 5 to 40% by weight of units of at least one monomer which enhances solubility in aliphatic substances selected from the group consisting of
  - (C) alkylmethacrylates having 6 to 18 carbon atoms in the alkyl residue, with monomers A, B and C together constituting at least 90% of the copolymerizate; and
  - (D) at least 0.1% of monomers containing a polar group; and
  - (E) 0.1 to 2% of multiple ethylenically unsaturated monomers.

5. The bonding agent according to claim 2 or 4, wherein said polar group is a hydroxyl group.

6. The bonding agent according to any one of claims 1 to 4, wherein the powder particles consist of an aliphatic-soluble core material and an aliphatic-soluble envelope material, wherein the core material consists of a polymerizate or copolymerizate having a higher proportion of units of alkylmethacrylate with 6 to 12 carbon atoms in the alkyl residue than the envelope material, said envelope material being the copolymer of any one of claims 1–4.

7. The bonding agent according to claim 1, 2, 3 or 4, which is a sheathed bead polymerizate having an average particle diameter of 0.005 to 1 mm.

8. The bonding agent according to claim 1, 2, 3 or 4, which is a spray-dried emulsion polymerizate with a core-shell structure.

9. A bonding agent solution containing the dissolved copolymer of claim 1, 2, 3 or 4 and aromatic-substance-free petroleum as solvent.

10. A paint comprising the bonding agent solution according to claim 9, and at least one pigment or filler dispersed therein.

11. The bonding agent according to claim 1, 2, 3 or 4, wherein the cycloalkylmethacrylate is cyclohexylmethacrylate and the substituted cyclohexylmethacrylate is 3,3,5-trimethylcyclohexylmethacrlate.

* * * * *